(12) United States Patent
Nakano

(10) Patent No.: US 8,611,253 B2
(45) Date of Patent: Dec. 17, 2013

(54) TELECOMMUNICATIONS APPARATUS AND METHOD, STORAGE MEDIUM, AND PROGRAM

(75) Inventor: Takehiko Nakano, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/605,437

(22) Filed: Sep. 6, 2012

(65) Prior Publication Data

US 2012/0327784 A1    Dec. 27, 2012

Related U.S. Application Data

(63) Continuation of application No. 12/533,746, filed on Jul. 31, 2009, now Pat. No. 8,289,880, which is a continuation of application No. 10/503,931, filed as application No. PCT/JP03/13682 on Oct. 27, 2003, now Pat. No. 7,626,943.

(30) Foreign Application Priority Data

Dec. 26, 2002   (JP) ................................. 2002-376558

(51) Int. Cl.
*H04L 12/28* (2006.01)

(52) U.S. Cl.
USPC .......................................... 370/254

(58) Field of Classification Search
None
See application file for complete search history.

(56) References Cited

U.S. PATENT DOCUMENTS

| | | |
|---|---|---|
| 5,477,531 A | 12/1995 | McKee et al. |
| 5,500,807 A | 3/1996 | Lavin et al. |
| 6,012,096 A | 1/2000 | Link et al. |
| 6,389,016 B1 | 5/2002 | Sabaa et al. |
| 8,264,984 B2 | 9/2012 | Nakano |
| 2002/0002541 A1 | 1/2002 | Williams |
| 2002/0120727 A1 | 8/2002 | Curley et al. |
| 2003/0105831 A1 | 6/2003 | O'Kane |
| 2004/0098583 A1* | 5/2004 | Weber .......................... 713/168 |
| 2004/0268131 A1 | 12/2004 | Kudo et al. |
| 2005/0078944 A1 | 4/2005 | Risan et al. |

(Continued)

FOREIGN PATENT DOCUMENTS

| | | |
|---|---|---|
| EP | 0 813 320 A2 | 12/1997 |
| EP | 0 999 673 A2 | 5/2000 |

(Continued)

OTHER PUBLICATIONS

European Search Report issued Feb. 20, 2013 in Patent Application No. 12199835.5.

(Continued)

*Primary Examiner* — Otis L Thompson, Jr.
(74) *Attorney, Agent, or Firm* — Oblon, Spivak, McClelland, Maier & Neustadt, L.L.P.

(57) ABSTRACT

The present invention relates to a telecommunications apparatus and a method, a storage medium, and a program for determining whether or not an other side communicating apparatus is near in a network. In a transmitting apparatus, a transmitting unit transmits a sending-message, and a control unit receives a response message to the sending-message, which includes acknowledgement information based on shared data and transmission information in the sending-message. The transmitting apparatus also includes a first judging unit that judges whether a response time of the acknowledgement message is less than a predetermined time. A receiving apparatus includes a generating unit that generates the acknowledgment information and transmits the response message to the transmitting apparatus.

24 Claims, 9 Drawing Sheets

(56) References Cited

U.S. PATENT DOCUMENTS

| | | |
|---|---|---|
| 2005/0287991 A1 | 12/2005 | Shima |
| 2006/0041642 A1 | 2/2006 | Rosner et al. |
| 2006/0153096 A1 | 7/2006 | Nakano |
| 2006/0154620 A1 | 7/2006 | Shima |
| 2006/0154631 A1 | 7/2006 | Nakano et al. |
| 2006/0209689 A1 | 9/2006 | Nakano et al. |
| 2012/0287805 A1 | 11/2012 | Nakano |

FOREIGN PATENT DOCUMENTS

| | | |
|---|---|---|
| GB | 2 356 536 A | 5/2001 |
| JP | 5-7218 | 1/1993 |
| JP | 11-203249 | 7/1999 |
| JP | 2001-285284 | 10/2001 |
| KR | 2001-0004137 | 1/2001 |
| WO | WO 01/76189 A2 | 10/2001 |
| WO | WO 2004/014037 A1 | 2/2004 |
| WO | WO 2004/030311 A1 | 4/2004 |

OTHER PUBLICATIONS

J. Postel, "Internet Control Message Protocol—Darpa Internet Program Protocol Specification", ISI, Network Working Group, Request for Comments: 792, XP015006774, Sep. 1, 1981, 22 pages.

"DTCP vol. 1 Supplementaql E Revision 1.0 (Informational Version)", Nov. 24, 2003, pp. 1-19.

Ian Fried, "Apple limits iTunes file sharing", [online], CNET News.com, May 27, 2003, Retrieved from internet <URL:http:news.com.com/2100-1027_3-1010541.html?tag=cd_mh>.

Hitachi Ltd., et al., "Digital Transmission Content Protection Specification vol. 1 Revision 1, 2a (Informational Version)" [online], digital Transmission Licensing Administrator, Feb. 25, 2002, Retrieved from internet: <URL:http://web.archive.org/web/20030604012332/www.ctcp.com/data/info_vl.pdf>.

Hachiro Endo, Batsuruy Man no Tameno Pasokon Katsuyo Jissen Koza-96-Network Settei no Kakunin Ho Ho; Materila Flow, Kabushiki Kaisha Ryutsu Kenkyusha, vol. 43, No. 5, p. 125, Jun. 1, 2002.

Patent Abstracts of Japan, JP 2001-285284, Oct. 12, 2001.

Patent Abstracts of Japan, JP 2002-033733, Jan. 31, 2002.

George Xylomenos and George C. Polyzos, TCP and UDP Performance over a Wireless LAN, Proceedings of the IEEE INFOCOM, 1999, pp. 439-446.

S.M Bellovin, "Security Problems in the TCP/IP Protocol Suite", Apr. 1989, Computer Communication Review, pp. 11-15.

European Search Report issued Oct. 4, 2013 in European Patent Application No. 13179770.6-1858, 8 pages.

\* cited by examiner

29

TELECOMMUNICATIONS APPARATUS AND METHOD, STORAGE MEDIUM, AND PROGRAM

CROSS-REFERENCE TO RELATED APPLICATION

This application is a continuation of and claims the benefit of priority under 35 U.S.C. §120 from U.S. application Ser. No. 12/533,746, filed Jul. 31, 2009 which is a continuation of Ser. No. 10/503,931, filed Aug. 13, 2004 (now U.S. Pat. No. 7,626,943), the entire contents of which is incorporated herein by reference. U.S. application Ser. No. 10/503,931 (now U.S. Pat. No. 7,626,943) is a national stage of International Application PCT/JP03/13682, filed Oct. 27, 2003 and claims the benefit of priority under 35 U.S.C. §119 of Japanese Patent Application No. 2002-376558, filed Dec. 26, 2002.

TECHNICAL FIELD

The present invention relates to a telecommunications apparatus and a method, a storage medium, and a program and, in particular, to a telecommunications apparatus and a method, a storage medium, and a program suitable for determining whether data communication takes place across a WAN such as the Internet or on a LAN in a house.

BACKGROUND ART

In recent years, with the widespread use of public wide area networks such as the Internet (hereinafter referred to as "WAN") and local area networks installed in houses (hereinafter referred to as "LAN") and along with the increased communication rate of these networks, a variety of data have been communicated by using personal computers and various types of electronic AV devices over these WANs and LANs.

This widespread use of these networks enables content data, such as video data, audio data, and program data, to be conveniently sold or shared by individuals. However, content data which is protected by copyright is sometimes illegally distributed because of such convenience. To prevent this, various types of countermeasures are proposed.

For example, some music download services limit the storage medium that stores the downloaded audio data to a storage medium having predetermined protection against being copied.

Additionally, for example, in communication of content data over a small network, such as a network based on IEEE 1394 standard, the encrypted content data are transferred after authentication to prevent the content data from being transferred to an unauthorized device.

Unfortunately, a communication scheme that prevents the illegal distribution of content data has not yet been established for IP protocols, which are commonly used for WAN communication. One possible solution is to limit the area of communication to a LAN when distributing the content data over an IP protocol. To limit the communication of content data within the LAN, it must be determined whether or not the other side communicating the content data is located on a LAN or a WAN. A method for such a determination, however, has not yet been established.

DISCLOSURE OF INVENTION

Accordingly, it is an object of the present invention to provide a scheme for determining whether the other side communicating the content data is located on a LAN or across a WAN.

A first telecommunications apparatus according to the present invention includes transmission means for transmitting a predetermined number of check packets after information indicating the sequence of the check packets is recorded in the check packets, receiving means for receiving transmitted check packets, checking means for checking the sequence of the predetermined number of check packets received by the receiving means, and determination means for determining, based on the checking result of the checking means, whether or not another apparatus for communication is located on the same first network as itself or across a second network different from the first network.

The determination means may determine that another apparatus for communication is located on the first network if the checking means determines that the predetermined number of check packets received by the receiving means is in sequence, or the determination means may determine that another apparatus for communication is located across the second network if the checking means determines that the predetermined number of check packets received by the receiving means is out of sequence.

The first network may be a local area network (LAN) and the second network may be a wide area network (WAN).

The communication means and the receiving means may work with a UDP protocol.

A first telecommunications method according to the present invention includes a step of transmitting a predetermined number of check packets after information indicating the sequence of the check packets is recorded in the check packets, a step of receiving transmitted check packets, a step of checking the sequence of the predetermined number of check packets received in the receiving step, and a step of determining, based on the checking result in the checking step, whether or not another apparatus for communication is located on the same first network as itself or across a second network different from the first network.

A first storage medium according to the present invention includes a program including a step of transmitting a predetermined number of check packets after information indicating the sequence of the check packets is recorded in the check packets, a step of receiving transmitted check packets, a step of checking the sequence of the predetermined number of check packets received in the receiving step, and a step of determining, based on the checking result in the checking step, whether or not another apparatus for communication is located on the same first network as itself or across a second network different from the first network.

A first program according to the present invention allows a computer to execute a step of transmitting a predetermined number of check packets after information indicating the sequence of the check packets is recorded in the check packets, a step of receiving transmitted check packets, a step of checking the sequence of the predetermined number of check packets received in the receiving step, and a step of determining, based on the checking result in the checking step, whether or not another apparatus for communication is located on the same first network as itself or across a second network different from the first network.

A second telecommunications apparatus according to the present invention includes transmission means for transmitting a predetermined number of check packets, receiving means for receiving transmitted check packets, information generating means for generating acknowledgement information and sending back the acknowledgement information after receiving the predetermined number of check packets by the receiving means, acquiring means for acquiring the acknowledgement information sent back from another apparatus for communication, measuring means for measuring an elapsed time from the transmission of the predetermined number of check packets by the transmission means to the reception of the acknowledgement information by the acquiring means, and determination means for determining, based on a measuring result of the measuring means, whether or not another apparatus for communication is located on the same first network as itself or across a second network different from the first network.

The determination means may determine that another apparatus for communication is located on the first network if the elapsed time measured by the measuring means is smaller than a predetermined threshold value or may determine that another apparatus for communication is located across the second network if the elapsed time measured by the measuring means is greater than or equal to the predetermined threshold value.

The first network may be a local area network (LAN) and the second network may be a wide area network (WAN).

The communication means and the receiving means may work with a TCP protocol or a UDP protocol.

A second telecommunications method according to the present invention includes a step of transmitting a predetermined number of check packets, a step of receiving transmitted check packets, a step of generating acknowledgement information and sending back the acknowledgement information after receiving the predetermined number of check packets in the receiving step, a step of acquiring the acknowledgement information sent back from another apparatus for communication, a step of measuring an elapsed time from the transmission of the predetermined number of check packets in the transmitting step to the reception of the acknowledgement information in the acquiring step, and a step of determining, based on a measuring result in the measuring step, whether or not another apparatus for communication is located on the same first network as itself or across a second network different from the first network.

A second storage medium includes a program including a step of transmitting a predetermined number of check packets, a step of receiving transmitted check packets, a step of generating acknowledgement information and sending back the acknowledgement information after receiving the predetermined number of check packets in the receiving step, a step of acquiring the acknowledgement information sent back from another apparatus for communication, a step of measuring an elapsed time from the transmission of the predetermined number of check packets in the transmitting step to the reception of the acknowledgement information in the acquiring step, and a step of determining, based on a measuring result in the measuring step, whether or not another apparatus for communication is located on the same first network as itself or across a second network different from the first network.

A second program according to the present invention allows a computer to execute a step of transmitting a predetermined number of check packets, a step of receiving transmitted check packets, a step of generating acknowledgement information and sending back the acknowledgement information after receiving the predetermined number of check packets in the receiving step, a step of acquiring the acknowledgement information sent back from another apparatus for communication, a step of measuring an elapsed time from the transmission of the predetermined number of check packets in the transmitting step to the reception of the acknowledgement information in the acquiring step, and a step of determining, based on a measuring result in the measuring step, whether or not another apparatus for communication is located on the same first network as itself or across a second network different from the first network.

A third telecommunications apparatus according to the present invention includes transmission means for transmitting a predetermined number of check packets and retransmitting the check packets if a communication error occurs, and determination means for determining that another apparatus for communication is located on the same first network as itself if the check packets are not retransmitted by the transmission means or determining that another apparatus for communication is located across a second network different from the first network if the check packets are retransmitted by the transmission means.

The transmission means may work with a Transmission Control Protocol (TCP).

The first network may be a local area network (LAN) and the second network may be a wide area network (WAN).

A third telecommunications method according to the present invention includes a step of transmitting a predetermined number of check packets and retransmitting the check packets if a communication error occurs and, a step of determining that another apparatus for communication is located on the same first network as itself if the check packets are not retransmitted in the transmitting step or determining that another apparatus for communication is located across a second network different from the first network if the check packets are retransmitted in the transmitting step.

A third storage medium according to the present invention includes a program including a step of transmitting a predetermined number of check packets and retransmitting the check packets if a communication error occurs, and a step of determining that another apparatus for communication is located on the same first network as itself if the check packets are not retransmitted in the transmitting step or determining that another apparatus for communication is located across a second network different from the first network if the check packets are retransmitted in the transmitting step.

A third program according to the present invention allows a computer to execute a step of transmitting a predetermined number of check packets and retransmitting the check packets if a communication error occurs and a step of determining that another apparatus for communication is located on the same first network as itself if the check packets are not retransmitted in the transmitting step or determining that another apparatus for communication is located across a second network different from the first network if the check packets are retransmitted in the transmitting step.

In the first telecommunications apparatus, telecommunications method, and program according to the present invention, the check packets in which information indicating the sequence of the check packets is recorded are received. The sequence of a predetermined number of the check packets is checked and the result of the check is used to determine whether another apparatus for communication is located on the same first network as itself or across a second network different from the first network.

In the second telecommunications apparatus, telecommunications method, and program according to the present invention, a predetermined number of check packets are transmitted to another apparatus for communication, and acknowledgement information sent back from the apparatus is received. In addition, an elapsed time from the transmission of the predetermined number of check packets to the reception of the acknowledgement information is measured. The result of the measurement is used to determine whether the apparatus for communication is located on the same first network as itself or across a second network different from the first network.

In the third telecommunications apparatus, telecommunications method, and program according to the present invention, a predetermined number of check packets are transmitted to another apparatus for communication and the check packets are retransmitted if a communication error occurs. If the check packets are not retransmitted, it is determined that another apparatus for communication is located on the same first network as itself. If the check packets are retransmitted, it is determined that another apparatus for communication is located across a second network different from the first network.

BEST MODE FOR CARRYING OUT THE INVENTION

Figure 1:
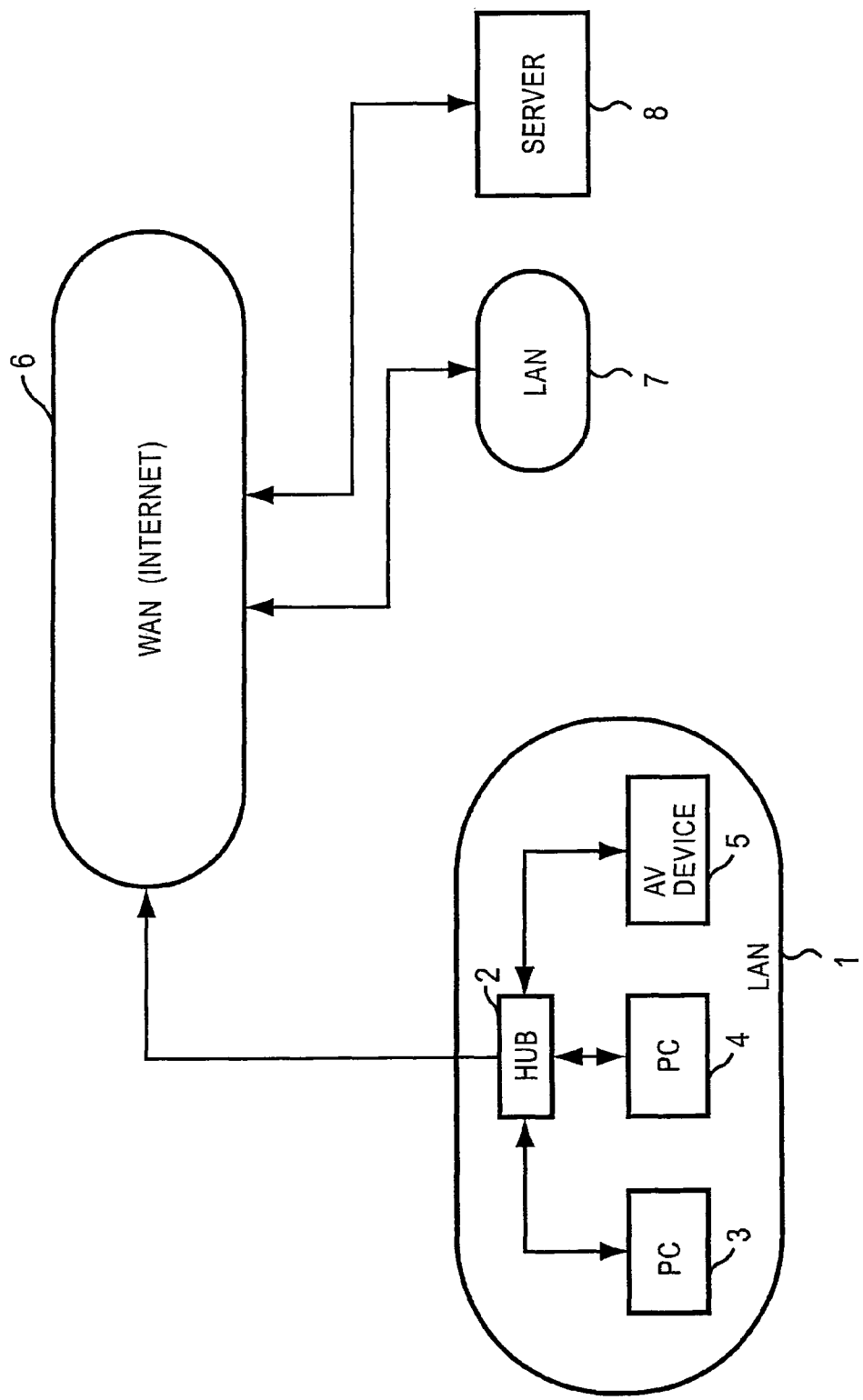
FIG. 1 is a block diagram of a configuration of a telecommunications system to which the present invention is applied.

FIG. 1 shows a configuration of a telecommunications system including a LAN having personal computers and AV devices according to an embodiment of the present invention. In this telecommunication system, LANs 1 and 7, and a server 8 are connected to one another across a WAN 6, such as the Internet.

The LAN 1 includes personal computers (PCs) 3 and 4, and an AV device 5, all connected via a switching hub 2. The LAN 1 is, for example, used for communication among specific individuals or a family in a house. The switching hub 2 is connected to the personal computers 3 and 4 and the AV device 5 via a high-speed interface, such as Ethernet (R) 100BASE-TX. Data communication can take place among the personal computers 3 and 4 and the AV device 5 at a rate of about 100 Mbps with a sufficiently low error rate. The personal computers (PCs) 3 and 4 and the AV device 5 can communicate with the LAN 7 or the server 8 via the switching hub 2 and the WAN 6.

The personal computer (PC) 3, upon transmission of content data, can determine whether or not the other side communicating the content data is located on the LAN 1, for example, the personal computer 4 or is located across the WAN 6, for example, the server 8.

Likewise, the personal computer 4 and the AV device 5, upon the transmission of content data, can determine whether the other side communicating the content data is located on the LAN 1, for example, the personal computer 3 or is located across the WAN 6, for example, the server 8.

The LAN 7 has the same configuration as that of the LAN 1, however, it is managed by a different user from the LAN 1. The server 8 is managed by a different user from the LANs 1 and 7.

Figure 2:
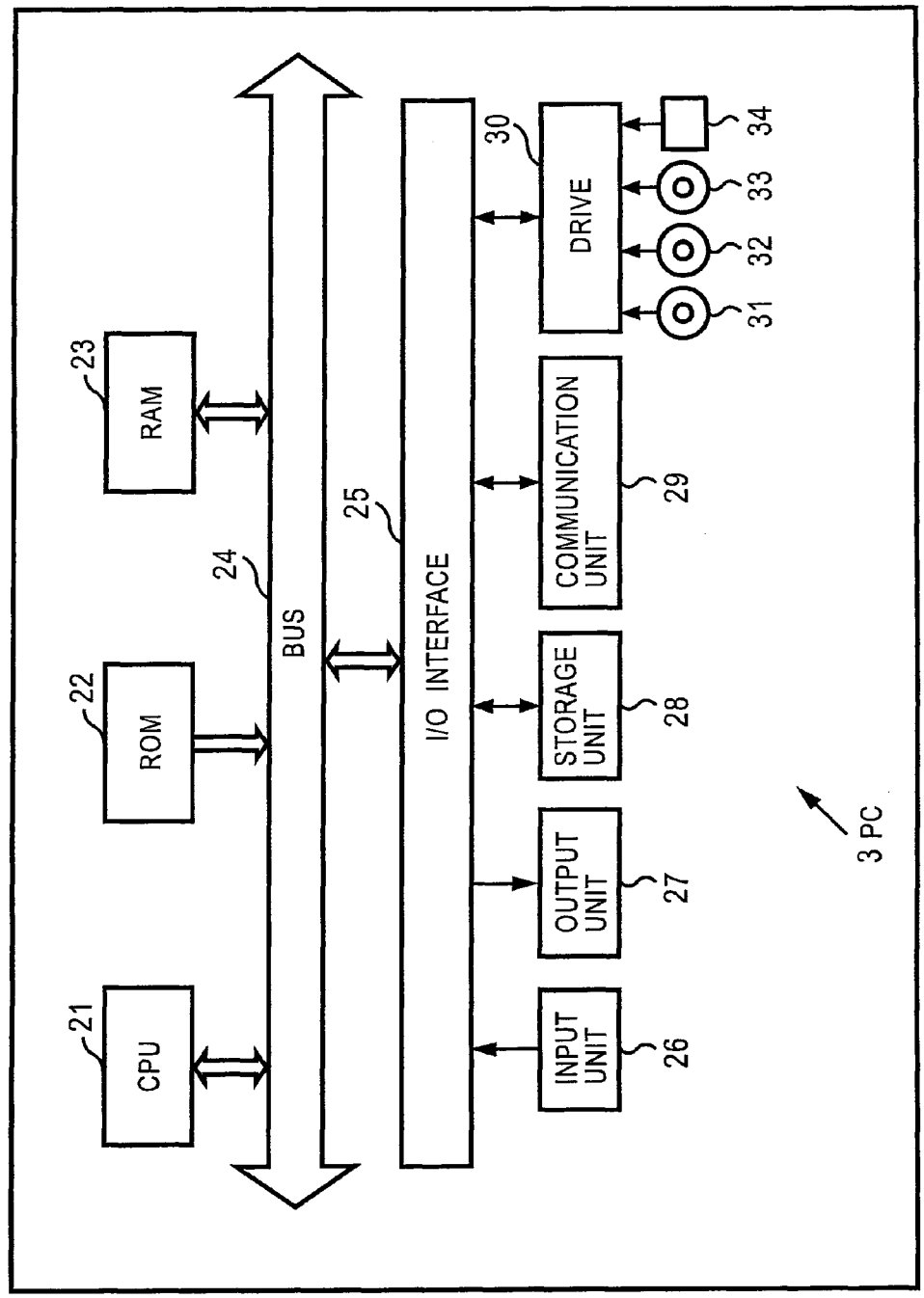
FIG. 2 shows a configuration of a personal computer shown in FIG. 1.

FIG. 2 shows a configuration of the personal computer 3. The personal computer 3 incorporates a central processing unit (CPU) 21, to which an I/O interface 25 is connected via a bus 24. A read only memory (ROM) 22 and a random access memory (RAM) 23 are connected to the bus 24.

The I/O interface 25 includes an input unit 26 composed of I/O devices, such as a keyboard and a mouse, by which a user enters operation commands, an output unit 27 which outputs video signals to display operation screens on a display unit, a storage unit 28 which includes a hard disk drive to store programs and other various types of data, and a communication unit 29 which includes an Ethernet (R) interface to transmit and receive data via a 100BASE-TX cable connected to the switching hub 2.

Instead of the Ethernet (R) interface, the communication unit 29 may include a universal serial bus (USB), or a high-speed interface, such as an Institute of Electrical and Electronics Engineers (IEEE) 1394.

Additionally, a drive 30 which reads and writes data to and from storage media, such as a magnetic disk 31, an optical disk 32, an optical magnetic disk 33, and a semiconductor memory 34, is connected to the I/O interface 25.

The CPU 21 performs various types of processes, which will be described below, under the control of a program in the ROM 22 or in the RAM 23. The program is read from the magnetic disk 31, the optical disk 32, the optical magnetic disk 33, or the semiconductor memory 34, is stored in the storage unit 28, and is then loaded from the storage unit 28 to the RAM 23. The RAM 23 also stores data required for the CPU 21 to perform the various types of processes.

Figure 3:
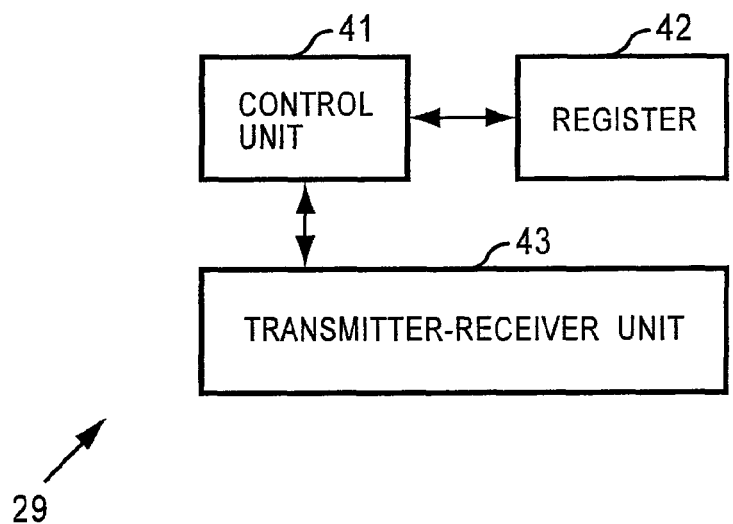
FIG. 3 shows a first configuration of a communication unit 29 shown in FIG. 2.

FIG. 3 shows a first configuration of a functional block achieved by the communication unit 29 in response to controls of the CPU 21. A control unit 41 controls a transmitter-receiver unit 43 which transmits and receives data over the user datagram protocol (UDP), which is one of the communication protocols. The control unit 41 accesses a register 42. Before the transmitter-receiver unit 43 transmits content data in response to the control of the control unit 41, it transmits a predetermined number of check packets to determine whether the other side communicating the content data is located on the LAN 1 or across the WAN 6.

Figure 4:
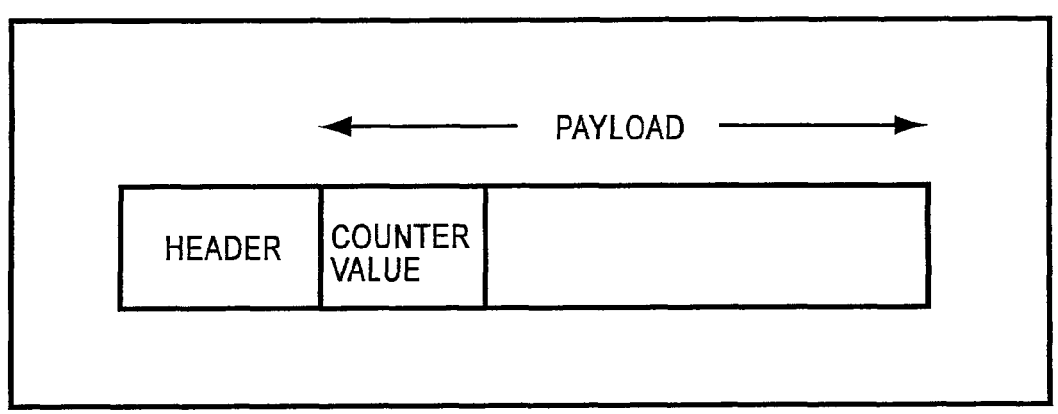
FIG. 4 shows an example of a check packet.

FIG. 4 shows an example of the check packet. In particular, this check packet has a payload to store a counter value generated by the control unit 41.

The PC 4 and the AV device 5 have the same hardware or software functional block as that of the communication unit 29 shown in FIG. 3. In addition, various types of apparatuses on the LAN 7 and the server 8 have the same functional block.

An outline of how to determine whether or not the other side communicating the content data is located on the LAN 1 or across the WAN 6 will now be described with reference to the first configuration of the communication unit 29.

The UDP protocol defines that, in the case of a communication error, a packet that is not transmitted correctly is discarded and is not retransmitted. Using this characteristic, whether or not the other side communicating the content data is located on the LAN 1 or across the WAN 6 can be determined.

More specifically, in a high-speed communication with a peer located on the LAN 1, the switching hub 2 transmits all packets to the peer without changing the sequence of the packets, whereas in a high-speed communication with a peer across the WAN 6, a communication error occurs due to a wide area networking and the UDP protocol discards the erroneous packet. Therefore, the peer does not receive some packets or receives the packets in a different order from the transmission order. This is used to determine whether the other side communicating the content data is located on the LAN 1 or across the WAN 6.

Figure 5:
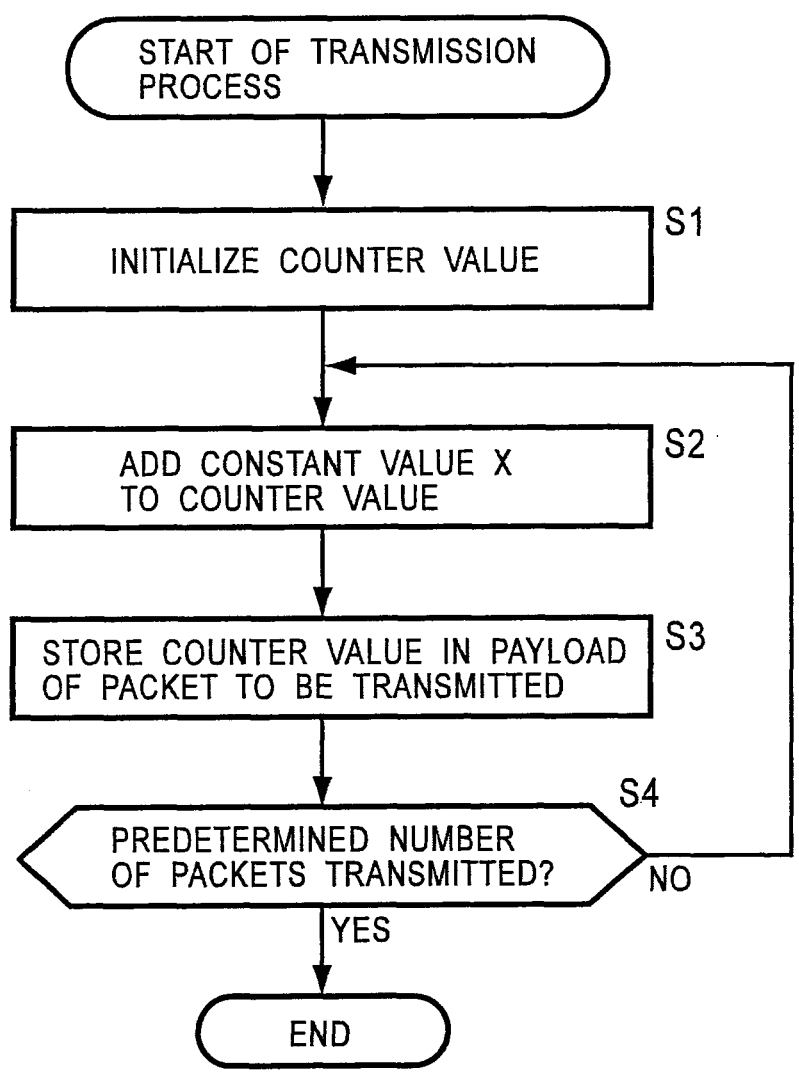
FIG. 5 is a flow chart explaining a transmission process in the first configuration of the communication unit 29.

A transmission process in the first configuration of the communication unit 29 shown in FIG. 3 will now be described with reference to the flow chart in FIG. 5. This transmission process determines whether the other side communicating the content data is located on the LAN 1 or across the WAN 6 before the communication of content data takes place.

In step S1, the control unit 41 assigns an initial value A to a value in a counter therein (counter value). In step S2, the control unit 41 increments the counter by a constant value X, then outputs the counter value to the transmitter-receiver unit 43. In step S3, the transmitter-receiver unit 43, in response to the control of the control unit 41, writes the counter value from the control unit 41 into the payload of a check packet and then transmits it to the other side communicating the content data.

In step S4, the control unit 41 determines whether the transmitter-receiver unit 43 transmits all the predetermined number of check packets. If all the predetermined number of check packets is not yet transmitted, the process returns to step S2 and the subsequent processes are repeated. If, in step S4, the control unit 41 determines that all the predetermined number of check packets is transmitted, the transmission process is completed. As described above, a plurality of check packets having sequential counter values are transmitted to the receiver.

Figure 6:
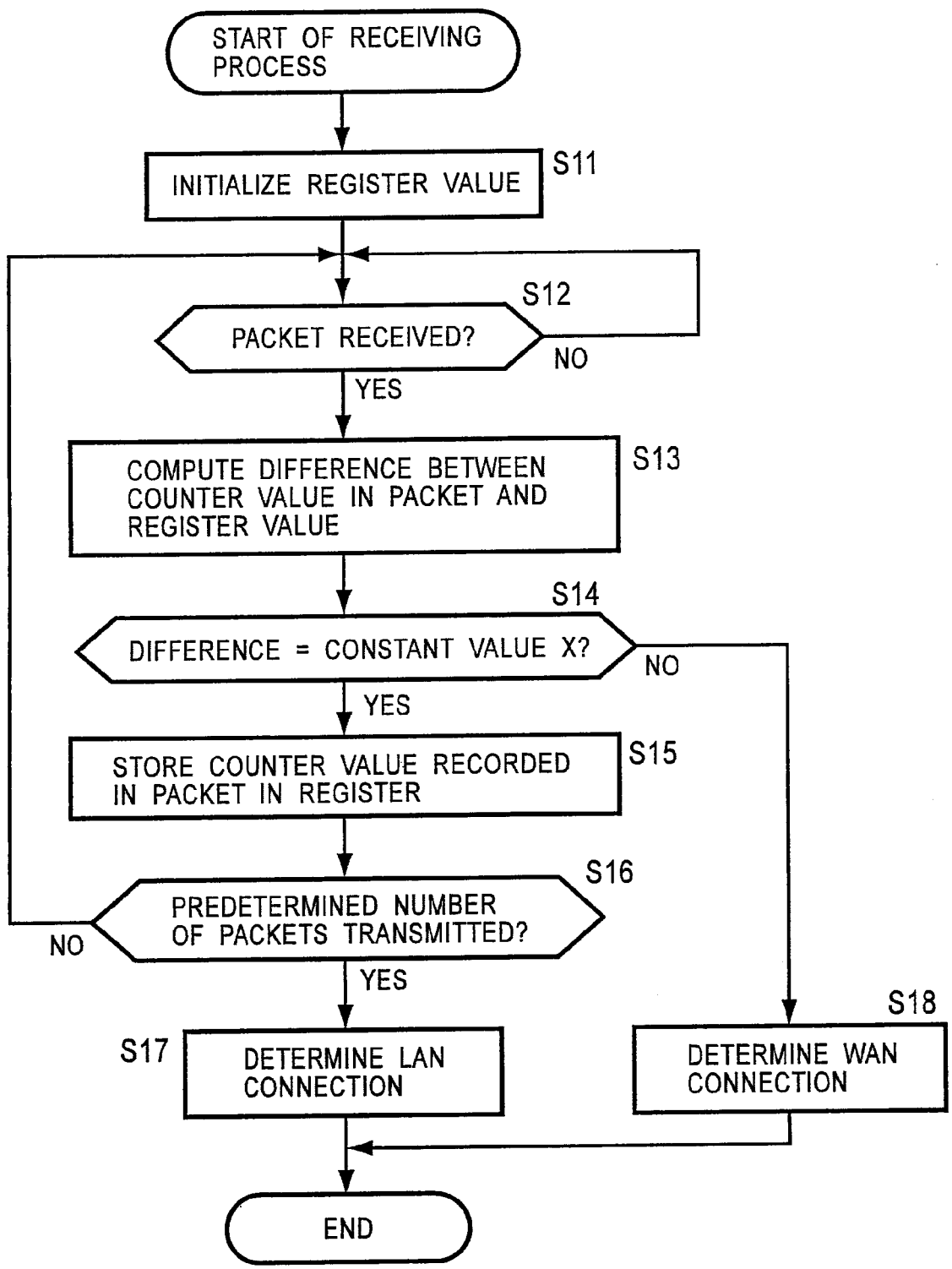
FIG. 6 is a flow chart explaining a receiving process in the first configuration of the communication unit 29.

A receiving process corresponding to the above described transmission process in the first configuration of the communication unit 29 will now be described with reference to a flow chart in FIG. 6. In step S11, the control unit 41 stores an initial value A in the register 42. In step S12, the transmitter-receiver unit 43 waits until the check packet transmitted from a transmitter is received. When the transmitter-receiver unit 43 receives the check packet, the process proceeds to step S13.

In step S13, the control unit 41 computes the difference between a counter value in a payload of the check packet received in step S12 and the value in the register 42. In step S14, the resultant difference computed in step S13 is checked to determine if it is equal to the constant value X. If the difference is equal to the constant value X, a check packet is not lost and the packet is received in the transmission sequence, and then the process proceeds to step S15.

In step S15, the control unit 41 stores the counter value recorded in the packet in step S13 in the register 42. In step S16, the control unit 41 determines whether the transmitter-receiver unit 43 receives all the predetermined number of check packets. If all the predetermined number of check packets is not yet received, the process returns to step S12 and the subsequent processes are repeated. Then, if, in step S16, it is determined that all the predetermined number of check packets is received, the process proceeds to step S17.

In step S17, the control unit 41 determines LAN connection, representing that the transmitter is located on the LAN 1.

In step S14, if the difference computed in step S13 is not equal to the constant value X, a check packet is lost or the check packet is received in a different sequence from the transmission sequence. Accordingly, the process proceeds to step S18. In step S18, the control unit 41 determines WAN connection, representing that the transmitter is located on the WAN 6. This is the end of the description of the receiving process.

For example, if it is determined that the communication takes place across a WAN connection in the receiving process, the usage of content data subsequently transmitted from the transmitter is strictly limited. In contrast, if it is determined that the communication takes place across a LAN connection, the usage of content data subsequently transmitted from the transmitter is moderately limited. This prevents the content data from being distributed across a WAN without impairing personal use on a LAN.

Figure 7:
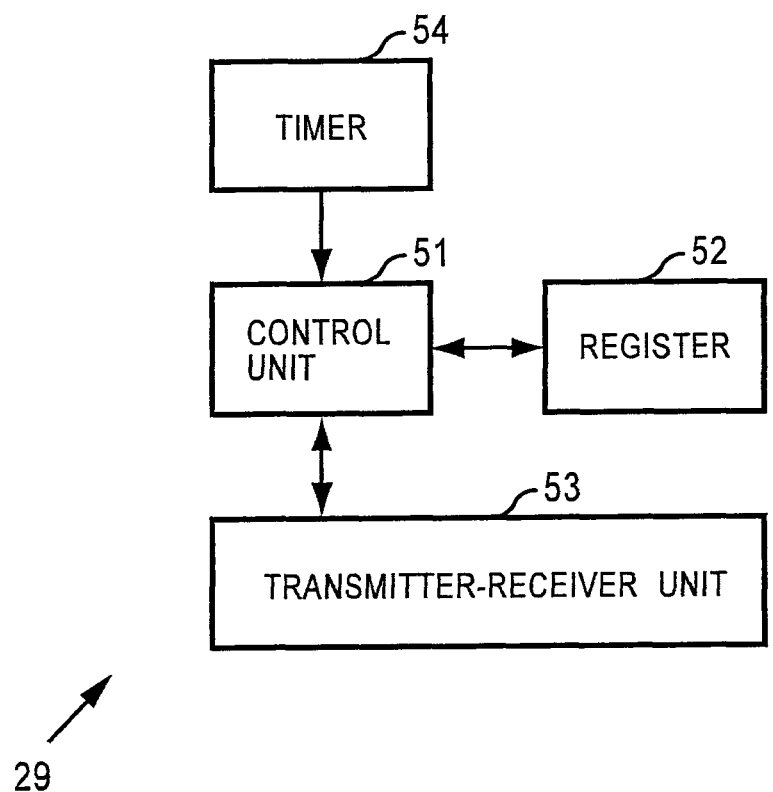
FIG. 7 shows a second configuration of the communication unit 29 shown in FIG. 2.

FIG. 7 shows a second configuration of a functional block achieved by the communication unit 29 in response to controls of the CPU 21. A control unit 51 controls a transmitter-receiver unit 53, which transmits and receives data over the TCP protocol or the UDP protocol. The control unit 51 also accesses a register 52. Before the transmitter-receiver unit 53 transmits content data in response to the control of the control unit 51, it transmits a predetermined number of check packets to determine whether the other side communicating the content data is located on the LAN 1 or across the WAN 6. A timer 54 measures time in response to the control of the control unit 51.

The PC 4 and the AV device 5 have the same hardware or software functional blocks as those of the communication unit 29 shown in FIG. 7. In addition, various types of apparatuses on the LAN 7 and the server 8 have the same functional blocks.

An outline of how to determine whether or not the other side communicating the data is located on the LAN 1 or across the WAN 6 will now be described with reference to the second configuration of the communication unit 29. In a communication on the LAN 1, the switching hub 2 ensures a high-speed communication rate. In contrast, in a communication across the WAN 6, the communication rate is decreased due to various reasons compared to the communication rate on the LAN 1. Based on this, it is determined whether or not the other side communicating the data is located on the LAN 1 or across the WAN 6.

Figure 8:
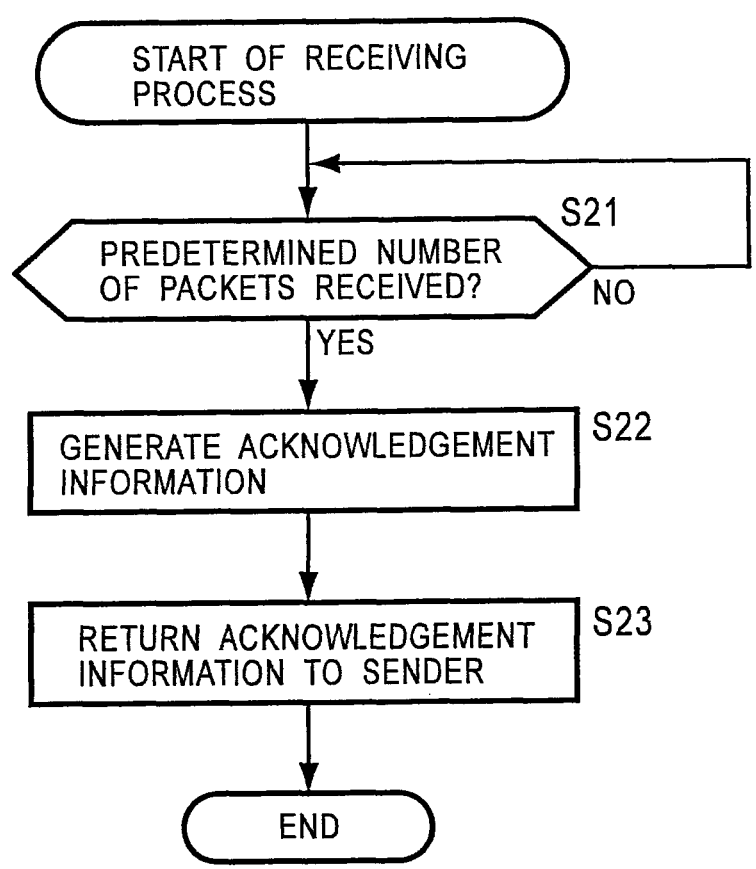
FIG. 8 is a flow chart explaining a receiving process in the second configuration of the communication unit 29.

A receiving process in the second configuration of the communication unit 29 will now be described with reference to the flow chart in FIG. 8. This receiving process starts when a transmitter transmits a check packet.

In step S21, the control unit 51 determines whether or not the transmitter-receiver unit 53 receives all the predetermined number of check packets. The control unit 51 waits until it is determined that all the predetermined number of check packets is received. If it is determined that all the predetermined number of check packets is received, the process proceeds to step S22. In step S22, the control unit 51 generates acknowledgement information indicating that all the predetermined number of check packets is received, and outputs the information to the transmitter-receiver unit 53. In step S23, the transmitter-receiver unit 53 transmits the acknowledgement information to the transmitter. Preferably, the acknowledgement information cannot be forged by a third party for security reasons. For example, the transmitter and the receiver share key information as privileged information. All data or part of the data is transmitted with a hash and the key information. This is the end of the description of the receiving process.

Figure 9:
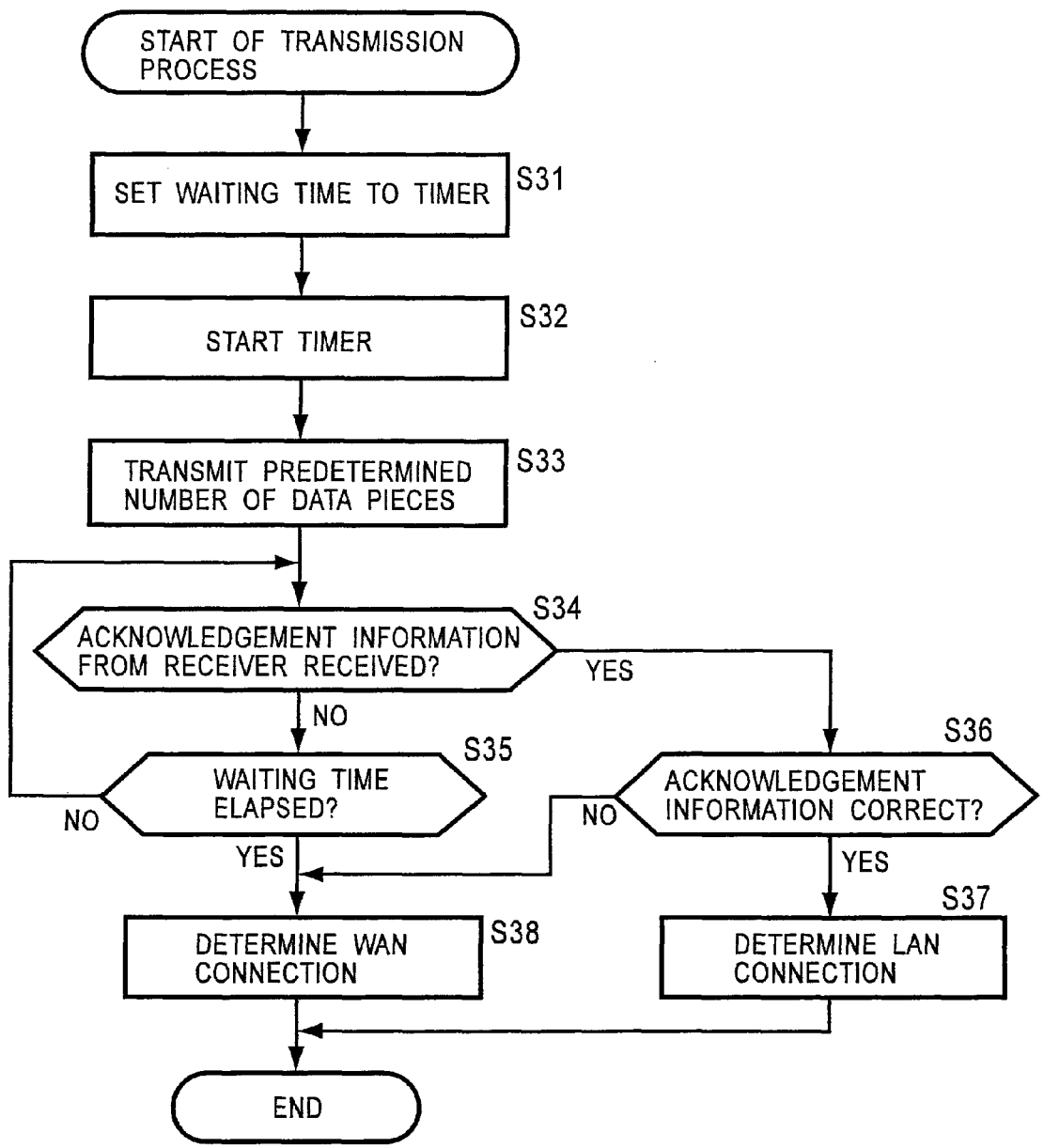
FIG. 9 is a flow chart explaining a transmission process in the second configuration of the communication unit 29.

A transmission process in the second configuration of the communication unit 29 will now be described with reference to the flow chart in FIG. 9. In step S31, the control unit 51 sets a waiting time in the timer 54. The waiting time is determined so as to be sufficient to receive the acknowledgement information sent back from a transmitter located on the LAN 1 after transmitting a predetermined number of check packets.

In step S32, the timer 54 starts measuring time in response to the control of the control unit 51. In step S33, the transmitter-receiver unit 53 transmits a predetermined number of check packets in response to the control of the control unit 51. A random number may be written into payloads of all check packets for every checking. The receiver generates the acknowledgement information with a hash and key information as described above to prevent the acknowledgement information from being forged improperly.

In step S34, the control unit 51 determines whether or not the transmitter-receiver unit 53 receives the acknowledgement information from the receiver. If the control unit 51 determines that the acknowledgement information is not received, then the process proceeds to step S35. In step S35, the control unit 51 checks if the waiting time, which is set in step S31, has elapsed or not. If it is determined that it has not elapsed, the process returns to step S34 and then the subsequent steps are repeated.

If, in step S34, the control unit 51 determines that the acknowledgement information is received, the process proceeds to step S36, where the control unit 51 checks if the acknowledgement information is correct or not. If it is not correct, the process proceeds to step S38. Otherwise, the process proceeds to step S37. In step S37, the control unit 51 determines that the communication takes place over a LAN connection, that is, the receiver is located on the LAN 1. In particular, to check the acknowledgement information, the transmitter may compute expected acknowledgement information as in the receiving process to compare with a value from the receiver.

If, in step S35, it is determined that the waiting time has elapsed, the process proceeds to step S38. In step S38, the control unit 51 determines that the communication takes place across a WAN connection, that is, the receiver is located across the WAN 6. This is the end of the description of the transmission process.

For example, if it is determined that the communication takes place across a WAN connection in this transmission process, subsequent transmission of content data is stopped. In contrast, if it is determined that the communication takes place on a LAN connection, the subsequent transmission of content data is allowed. This prevents the content data from being distributed across a WAN without impairing personal use on a LAN.

A third communication via a Transmission Control protocol (TCP) in the communication unit 29 will now be described. In the TCP protocol, when a communication error occurs, an erroneous packet is retransmitted until all the packets are transmitted successfully. If a high-speed TCP communication that exceeds the speed of a WAN takes place, retransmissions do not occur on the LAN 1, however, retransmissions occur across the WAN 6.

Figure 10:
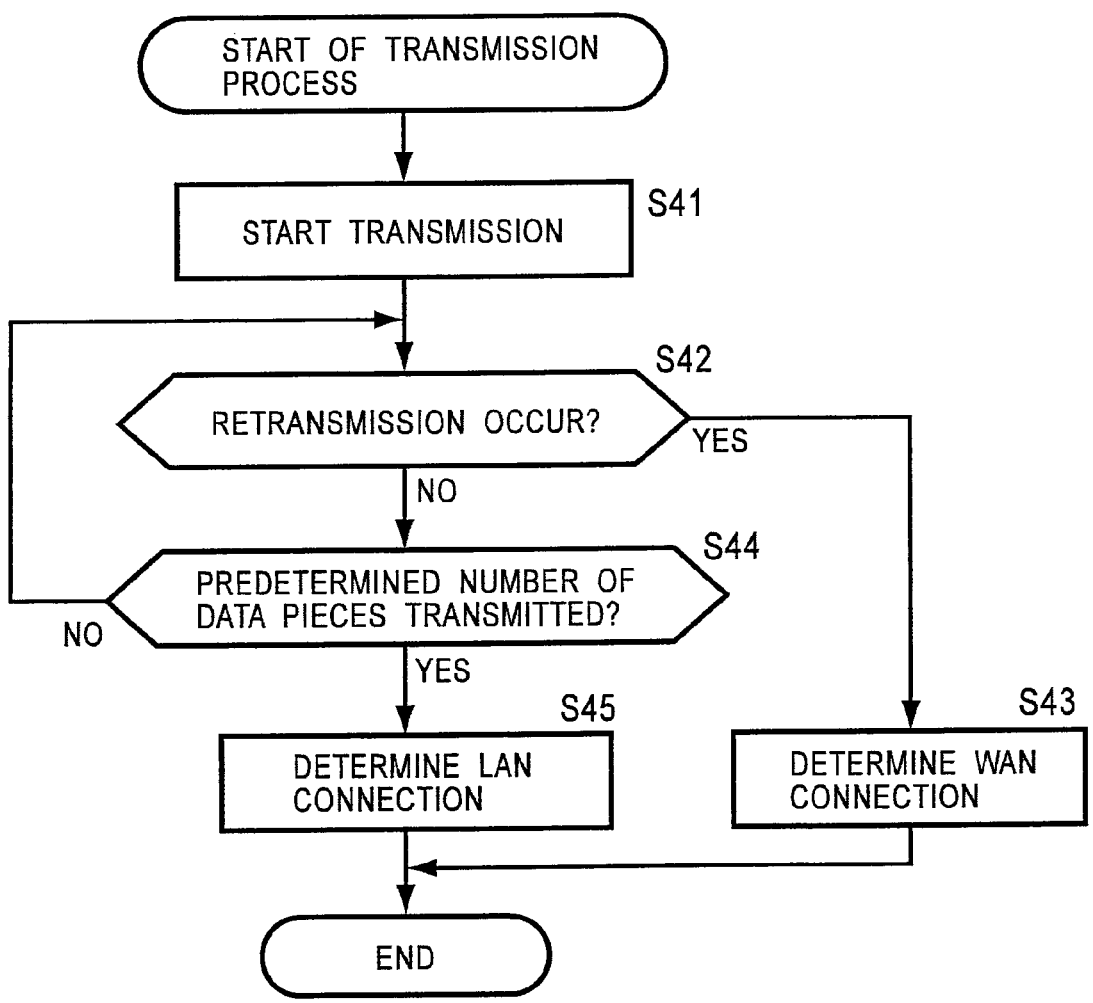
FIG. 10 is a flow chart explaining a transmission process over a TCP protocol.

A transmission process to determine whether or not the receiver is located on the LAN 1 or across the WAN 6 by using this characteristic of the TCP protocol will now be described with reference to the flow chart in FIG. 10. This transmission process is performed before the communication of content data. In this case, the configuration of the communication unit 29 is identical to that in FIG. 3.

In step S41, the transmitter-receiver unit 43 starts to transmit check packets in response to the control of the control unit 41. In step S42, the control unit 41 determines whether or not the transmitter-receiver unit 43 retransmits the check packets. If it is determined that retransmission of the check packets occurs, the process proceeds to step S43.

In step S43, the control unit 41 determines WAN connection, representing that the receiver is located on the WAN 6.

If, in step S42, it is determined that retransmission of the check packets does not occur, the process proceeds to step S44. In step S44, the control unit 41 determines whether or not the transmitter-receiver unit 43 transmits a predetermined number of check packets. If it is determined that the predetermined number of check packets is not transmitted, the process returns to step S42 and then the subsequent process is repeated. Subsequently, if, in step S44, it is determined that the predetermined number of check packets is transmitted, the process proceeds to step S45.

In step S45, the control unit 41 determines LAN connection, representing that the receiver is located on the LAN 1. This is the end of the description of the transmission process.

For example, if it is determined that the communication takes place across a WAN connection in this transmission process, subsequent transmission of content data is stopped. In contrast, if it is determined that the communication takes place across a LAN connection, the subsequent transmission of content data is allowed. This can prevent the content data from being distributed across a WAN without impairing personal use on a LAN.

In the present specification, the steps that describe the program stored in the storage media include not only processes executed in the above described sequence, but also processes that may be executed in parallel or independently.

In addition, as used in the specification, "system" refers to a whole device including a plurality of devices.

INDUSTRIAL APPLICABILITY

According to the present invention, it can be determined whether or not the other side communicating content data is located on a LAN or across a WAN.

The invention claimed is:
1. A transmitting apparatus comprising:
a user input unit configured to receive a user input;
a communication interface configured to transmit a check packet to a receiving apparatus using Transfer Control Protocol (TCP), the check packet including a random number that is different from random numbers included in other check packets transmitted from the transmitting apparatus; and
circuitry configured to:
  receive a TCP acknowledgement message to the check packet from the receiving apparatus, the TCP acknowledgement message including acknowledgement information based on shared data shared with the receiving apparatus;
  compute expected acknowledgment information based on the shared data shared with the receiving apparatus;
  produce a comparison result for the receiving apparatus based on the acknowledgment information and the expected acknowledgment information;
  count a time elapsed from transmitting the check packet; and
  prohibit transmission of data to the receiving apparatus when the comparison result indicates that acknowledgment information and the expected acknowledgment information do not match or when a predetermined time elapsed from transmitting the check packet expires before the acknowledgment message is received.

2. The transmitting apparatus of claim 1, wherein the shared data is a key shared between the transmitting apparatus and the receiving apparatus.

3. The transmitting apparatus of claim 2, wherein the key is shared between the transmitting apparatus and the receiving apparatus before the check packet is transmitted from the transmitting apparatus to the receiving apparatus.

4. The transmitting apparatus of claim 1, wherein the circuitry is configured to maintain a count value indicating a number of check packets that have been transmitted to the receiving apparatus.

5. The transmitting apparatus of claim 4, wherein the circuitry is configured to increment the count value a constant value each time a check packet is transmitted to the receiving apparatus.

6. The transmitting apparatus of claim 4, wherein the check packet transmitted to the receiving apparatus includes data corresponding to the count value.

7. The transmitting apparatus of claim 6, wherein the acknowledgment information included in the TCP acknowledgement message is computed based on the data corresponding to the count value and the shared data.

8. The transmitting apparatus of claim 4, wherein the expected acknowledgment information is computed based on the count value and the shared data.

9. The transmitting apparatus of claim 1, further comprising:
a memory configured to store data to be transmitted from the transmitting apparatus to the receiving apparatus.

10. The transmitting apparatus of claim 9, further comprising:
a display configured to display the data stored in the memory.

11. A non-transitory computer-readable medium including computer program instructions, which when executed by a transmitting apparatus, cause the transmitting apparatus to:
transmit a check packet to a receiving apparatus using Transfer Control Protocol (TCP), the check packet including a random number that is different from random numbers included in other check packets transmitted from the transmitting apparatus;
receive a TCP acknowledgement message to the check packet from the receiving apparatus, the TCP acknowledgement message including acknowledgement information based on shared data shared with the receiving apparatus;
compute expected acknowledgment information based on the shared data shared with the receiving apparatus;
produce a comparison result for the receiving apparatus based on the acknowledgment information and the expected acknowledgment information;
count a time elapsed from transmitting the check packet; and
prohibit transmission of data to the receiving apparatus when the comparison result indicates that acknowledgment information and the expected acknowledgment information do not match or when a predetermined time elapsed from transmitting the check packet expires before the acknowledgment message is received.

12. The non-transitory computer-readable medium of claim 11, wherein the shared data is a key shared between the transmitting apparatus and the receiving apparatus.

13. The non-transitory computer-readable medium of claim 12, wherein the key is shared between the transmitting apparatus and the receiving apparatus before the check packet is transmitted from the transmitting apparatus to the receiving apparatus.

14. The non-transitory computer-readable medium of claim 11, wherein the computer program instructions further cause the transmitting apparatus to:
maintain a count value indicating a number of check packets that have been transmitted to the receiving apparatus.

15. The non-transitory computer-readable medium of claim 14, wherein the check packet transmitted to the receiving apparatus includes data corresponding to the count value.

16. The non-transitory computer-readable medium of claim 15, wherein the acknowledgment information included in the TCP acknowledgement message is computed based on the data corresponding to the count value and the shared data.

17. The non-transitory computer-readable medium of claim 14, wherein the expected acknowledgment information is computed based on the count value and the shared data.

18. A method performed by a transmitting apparatus, the method comprising:
transmitting a check packet to a receiving apparatus using Transfer Control Protocol (TCP), the check packet including a random number that is different from random numbers included in other check packets transmitted from the transmitting apparatus;
receiving a TCP acknowledgement message to the check packet from the receiving apparatus, the TCP acknowledgement message including acknowledgement information based on shared data shared with the receiving apparatus;
computing, by circuitry of the transmitting apparatus, expected acknowledgment information based on the shared data shared with the receiving apparatus;
producing, by the circuitry, a comparison result for the receiving apparatus based on the acknowledgment information and the expected acknowledgment information;
counting, by the circuitry, a time elapsed from transmitting the check packet; and
prohibiting, by the circuitry, transmission of data to the receiving apparatus when the comparison result indicates that acknowledgment information and the expected acknowledgment information do not match or when a predetermined time elapsed from transmitting the check packet expires before the acknowledgment message is received.

19. An information processing apparatus comprising:
circuitry configured to:
output a check packet to another information processing apparatus using Transfer Control Protocol (TCP), the check packet including a random number that is different from random numbers included in other check packets output from the information processing apparatus;
receive a TCP acknowledgement message to the check packet from the another information processing apparatus, the TCP acknowledgement message including acknowledgement information based on shared data shared with the another information processing apparatus;
compute expected acknowledgment information based on the shared data shared with the another information processing apparatus;

produce a comparison result for the another information processing apparatus based on the acknowledgment information and the expected acknowledgment information;

count a time elapsed from transmitting the check packet; and prohibit transmission of data to the another information processing apparatus when the comparison result indicates that acknowledgment information and the expected acknowledgment information do not match or when a predetermined time elapsed from transmitting the check packet expires before the acknowledgment message is received.

20. A transmitting apparatus comprising:

a user input unit configured to receive a user input;

a communication interface configured to transmit a check packet to a receiving apparatus using Transfer Control Protocol (TCP), the check packet including a random number that is different from random numbers included in other check packets transmitted from the transmitting apparatus; and circuitry configured to:
  receive a TCP acknowledgement message to the check packet from the receiving apparatus, the TCP acknowledgement message including acknowledgement information based on shared data shared with the data receiving apparatus;
  compute expected acknowledgment information based on the shared data shared with the data receiving apparatus;
  produce a comparison result for the data receiving apparatus based on the acknowledgment information and the expected acknowledgment information;
  determine whether a response time of the TCP acknowledgement message is less than a predetermined time; and
  prohibit transmission of content data to the data receiving apparatus when the comparison result indicates that acknowledgment information and the expected acknowledgment information do not match or when the determining determines that the response time of the TCP acknowledgment message is longer than the predetermined time.

21. A non-transitory computer-readable medium including computer program instructions, which when executed by a transmitting apparatus, cause the transmitting apparatus to:

transmit a check packet to a receiving apparatus using Transfer Control Protocol (TCP), the check packet including a random number that is different from random numbers included in other check packets transmitted from the transmitting apparatus;

receive a TCP acknowledgement message to the check packet from the receiving apparatus, the TCP acknowledgement message including acknowledgement information based on shared data shared with the data receiving apparatus;

compute expected acknowledgment information based on the shared data shared with the data receiving apparatus;

produce a comparison result for the data receiving apparatus based on the acknowledgment information and the expected acknowledgment information;

determine whether a response time of the TCP acknowledgement message is less than a predetermined time; and prohibit transmission of content data to the data receiving apparatus when the comparison result indicates that acknowledgment information and the expected acknowledgment information do not match or when the determining determines that the response time of the TCP acknowledgment message is longer than the predetermined time.

22. A method performed by a transmitting apparatus, the method comprising:

transmitting a check packet to a receiving apparatus using Transfer Control Protocol (TCP), the check packet including a random number that is different from random numbers included in other check packets transmitted from the transmitting apparatus;

receiving a TCP acknowledgement message to the check packet from the receiving apparatus, the TCP acknowledgement message including acknowledgement information based on shared data shared with the receiving apparatus;

computing, by circuitry of the transmitting apparatus, expected acknowledgment information based on the shared data shared with the data receiving apparatus;

producing, by the circuitry, a comparison result for the data receiving apparatus based on the acknowledgment information and the expected acknowledgment information;

determining, by the circuitry, whether a response time of the TCP acknowledgement message is less than a predetermined time; and prohibiting, by the circuitry, transmission of content data to the data receiving apparatus when the comparison result indicates that acknowledgment information and the expected acknowledgment information do not match or when the determining determines that the response time of the TCP acknowledgment message is longer than the predetermined time.

23. An information processing apparatus comprising:

circuitry configured to:
  output a check packet to another information processing apparatus using Transfer Control Protocol (TCP), the check packet including a random number that is different from random numbers included in other check packets output from the information processing apparatus;
  receive a TCP acknowledgement message to the check packet from the another information processing apparatus, the TCP acknowledgement message including acknowledgement information based on shared data shared with the another information processing apparatus;
  compute expected acknowledgment information based on the shared data shared with the another information processing apparatus;
  produce a comparison result for the another information processing apparatus based on the acknowledgment information and the expected acknowledgment information;
  determine whether a response time of the TCP acknowledgement message is less than a predetermined time; and
  prohibit transmission of content data to the another information processing apparatus when the comparison result indicates that acknowledgment information and the expected acknowledgment information do not match or when the determining determines that the response time of the TCP acknowledgment message is longer than the predetermined time.

24. An information processing system having a non-transitory computer-readable medium and an interface comprising:

the non-transitory computer-readable medium including computer-program instructions, which when executed by an electronic device, cause the electronic device to:

output a check packet to another information processing apparatus using Transfer Control Protocol (TCP), the check packet including a random number that is different from random numbers included in other check packets output from the electronic device;

receive a TCP acknowledgement message to the check packet from the another information processing apparatus, the TCP acknowledgement message including acknowledgement information based on shared data shared with the another information processing apparatus;

compute expected acknowledgment information based on the shared data shared with the another information processing apparatus;

produce a comparison result for the another information processing apparatus based on the acknowledgment information and the expected acknowledgment information;

determine whether a response time of the TCP acknowledgement message is less than a predetermined time; and prohibit transmission of content data to the another information processing apparatus when the comparison result indicates that acknowledgment information and the expected acknowledgment information do not match or when the determining determines that the response time of the TCP acknowledgment message is longer than the predetermined time.

* * * * *